Feb. 12, 1924.

J. A. CARSON 1,483,779

HEADLIGHT ATTACHMENT

Filed March 11, 1921

John A. Carson, INVENTOR

BY Victor J. Evans ATTORNEY

WITNESS:

Patented Feb. 12, 1924.

1,483,779

UNITED STATES PATENT OFFICE.

JOHN A. CARSON, OF HUNTINGTON, NEW YORK.

HEADLIGHT ATTACHMENT.

Application filed March 11, 1921. Serial No. 451,553.

*To all whom it may concern:*

Be it known that I, JOHN A. CARSON, a citizen of the United States, residing at Huntington, Long Island, in the county of Suffolk and State of New York, have invented new and useful Improvements in Headlight Attachments, of which the following is a specification.

This invention relates to headlight attachments and particularly to attachments for use with the headlights of automobiles.

In many cities and States there are statutes forbidding the driving of cars at night unless both headlights are lighted. The diffusion of the light beams particularly where anti-glare lenses are used, makes it extremely difficult for the driver of a car to know whether both headlights are illuminated or only one. It is therefore necessary for the driver to make frequent stops and inspect his lamps or run the chance of being summoned to court for driving in violation of the law. One of the purposes of the present invention is to provide a signal which will inform the driver when either headlight is extinguished.

In driving an automobile, when another car is approaching from the opposite direction, the glare of the headlights of the approaching car give warning of its approach, but the diffusion of light and its glare render it difficult to tell the exact location of the car, so that while the driver may think he is giving ample room for free passage of the cars, he may not be doing so. A second object of my invention is, therefore, to provide means for indicating to approaching cars the exact location of the car provided with the herein described improvements.

Another object is to provide means whereby a portion of the light from the head lamps may be utilized for effecting both of these signals.

With these and other objects in view which will be more apparent as the specification proceeds, the invention resides in certain novel construction and combination and arrangement of parts, the essential features of which are hereinafter fully described, are particularly pointed out in the appended claim, and are illustrated in the accompanying drawing, in which:—

Like characters of reference refer to like parts in all views.

Figure 1:
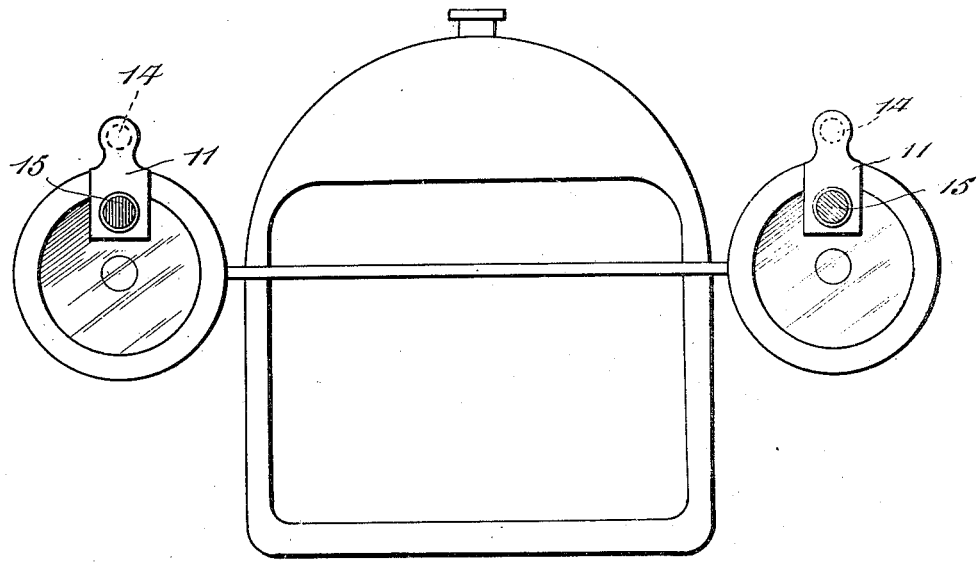
Figure 1 is a front elevation of a portion of an automobile showing my improvements in place on the headlights.
Figure 3:
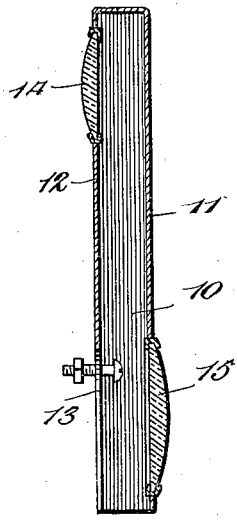
Figure 3 is a vertical, front-to-rear section of the attachment.
Figure 2:
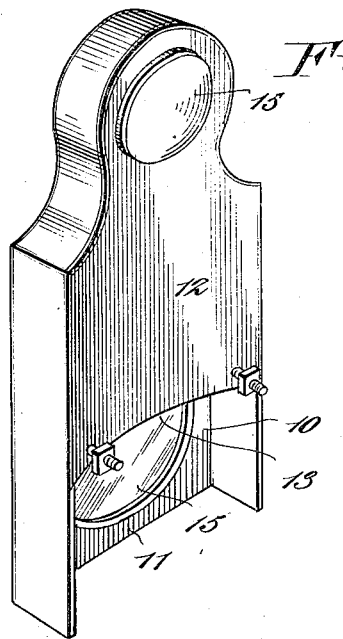
Figure 2 is a perspective view of the attachment per se.

Referring to the drawing in detail, 10 represents a light chamber having front and rear walls 11 and 12 and closed at the top. The rear wall 12 is cut away at 13 so as to conform to the contour of the headlight to which it is secured by bolts, screws, or other suitable means. Secured in the rear wall 12 and above the headlight is a small bull's eye 14 preferably of colored glass; while a similar but larger bull's eye 15 is mounted in the lower portion of the front wall 11 in front of the ordinary lens of the headlight so as to be illuminated by a portion of the light passing through the said lens. It is desirable that the right-hand bull's eyes 14 and 15 be red and the left hand ones green.

It will be seen that in this manner the bull's eyes 15 will form colored "spots" whereby an approaching car may accurately determine the position of the car carrying the above described equipment; and a portion of the light will be deflected into the upper portion of the light chamber 10 so as to illuminate the bull's eye 14, thereby giving constant notice to the driver as to the condition of his lights.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

In a device of the class described, the combination with a headlight, a light chamber having front and rear walls and open at its bottom, a portion of the rear wall being cut-away to fit the contour of the headlight, means for removably securing said light chamber to the headlight, a bull's eye mounted in the front wall of said light chamber and disposed in the path of light rays from said headlight and adapted to deflect a portion of the light into the upper part of the light chamber, a bull's eye mounted in the rear wall of said light chamber and disposed above the headlight and adapted to utilize the light deflected to the upper part of said light chamber.

In testimony whereof I have affixed my signature.

JOHN A. CARSON.